(12) United States Patent
Flynn, Jr.

(10) Patent No.: US 7,366,800 B2
(45) Date of Patent: Apr. 29, 2008

(54) SYSTEM AND METHOD FOR DYNAMICALLY ASSIGNING I/O PRIORITY

(75) Inventor: John Thomas Flynn, Jr., Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 10/683,149

(22) Filed: Oct. 9, 2003

(65) Prior Publication Data

US 2005/0080940 A1 Apr. 14, 2005

(51) Int. Cl.
*G06F 3/00* (2006.01)
(52) U.S. Cl. .......................................... 710/40; 710/41
(58) Field of Classification Search ................. 710/36, 710/37, 40, 41
See application file for complete search history.

(56) References Cited

U.S. PATENT DOCUMENTS 5,937,205 A * 8/1999 Mattson et al. ................ 710/6
6,157,963 A * 12/2000 Courtright et al. ............. 710/5
6,260,090 B1 * 7/2001 Fuhs et al. ................... 710/107

\* cited by examiner

*Primary Examiner*—Alford Kindred
*Assistant Examiner*—David Martinez
(74) *Attorney, Agent, or Firm*—Randall J. Bluestone; Shelley M Beckstrand

(57) ABSTRACT

A system for controlling I/O transfers includes a host system or initiator including an adapter driver layer; and a storage controller. The storage controller includes a priority store and an operation queue. The adapter driver is selectively responsive to a datapath command from an initiator application for setting a default I/O priority for a specified logical unit, for storing the default I/O priority for the logical unit to a priority store of the storage controller, and selectively responsive to a data transfer command from an initiator application for storing the data transfer command to the storage controller. The storage controller is responsive to the datapath command for storing the I/O priority default value for the logical unit to the priority store; and responsive to the data transfer command with respect to the logical unit for queuing the data transfer command for execution based on the I/O priority default value.

6 Claims, 5 Drawing Sheets

COMMAND DESCRIPTOR BLOCK
SCSI COMMAND

SYSTEM AND METHOD FOR DYNAMICALLY ASSIGNING I/O PRIORITY

BACKGROUND OF THE INVENTION

1. Technical Field of the Invention

This invention relates to a system and method for dynamically assigning Input/Output (I/O) priority in an open system.

2. Background Art

The Small Computer Serial Interface (SCSI) standard (ANSI X3.131-1994 and later versions) describes a well-defined peripheral bus that is independent of computer system buses. It is a shared, contention-based resource. A SCSI device connects to a SCSI bus via the device's controller and may be either a peripheral device or a host computer. Typically, one or more host computers connect to one or more peripheral devices through a SCSI bus. This arrangement allows users to upgrade presently-connected devices or add new devices to the bus without changing the devices already connect to the bus.

SCSI devices are either initiators or targets, or both. An initiator is a device such as a host computer that initiates and delivers requests for tasks for fulfillment. If a device can be both an initiator and target, it may only behave on the bus as one at any instant. A target is a device such as a disk drive that performs requested tasks. The SCSI architecture allows two, and only two, devices to communicate with each other over a shared bus simultaneously.

SCSI devices communicate with one another using a well-defined protocol involving sequential states called phases. A SCSI bus can only be in one phase at a time and will enter most phases only after exiting previous specific states. Initiators communicate with targets through bus requests called commands. Thereafter, the targets control request resolution. After receiving a command, but before fulfilling it, a target may disconnect from the bus. This allows initiators to perform other work (such as issuing commands to other targets) as the target performs internal processing.

Each SCSI device has a unique bus ID which users set using switches, jumpers, or set-up routines. Hosts typically have the highest SCSI bus ID, allowing them to initiate requests with minimum peripheral device interference. To obtain bus control, devices must wait for the bus to achieve a bus free phase which indicates the bus is idle. Devices then arbitrate for bus control. The winning device proceeds through a number of additional phases to complete its task. Losing devices must wait for the bus to achieve another bus free phase, at which time these losing devices may once again attempt to gain control of the SCSI bus.

This fixed priority arbitration scheme of SCSI has drawbacks. Higher-priority devices get access first, tending to monopolize the SCSI bus by consuming most, if not all, of the SCSI bus bandwidth, and possibly preventing lower-priority devices from gaining sufficient access to the SCSI bus to perform properly. This adverse effect on lower-priority devices is known as "access starvation," "initiator starvation," or "target starvation." If a server (or initiator) is doing very fast I/O (which happens often if a server is doing a backup and no processing of data), it could flood a storage subsystem with I/O, especially if it is attached to the storage controller by a different SCSI bus than a production server that is doing processing of data in addition to doing I/O. However, inasmuch the production server I/O is generally more important than the backup I/O, there is a need in the art for a facility which allocates more I/O bandwidth to the production server I/O.

U.S. Pat. No. 6,223,244 describes a method whereby a high priority initiator on a shared bus is self-regulating by listening for pings from lower priority initiators so that it does not monopolize the bus and starve lower priority initiators, thus assuring that each initiator receives a share of bus bandwidth.

In the IBM Total Enterprise Storage Server (ESS), the zOS Work load Manager (WLM) controls I/O priority among I/O initiators for Extended Count Key Data (ECKD) volumes by assigning an I/O priority to each I/O operation. This is done by inserting an I/O priority value in either the Define Extent or Prefix Channel Control Word (CCW) parameter data sent to a storage controller in connection with each I/O operation. In this system, for parallel SCSI or Fiber Channel Protocol (FCP, a serial channel having, insofar as the present invention is concerned, similar characteristics to the parallel SCSI channel) initiator attachment, the storage controller assigns a static default priority to all I/O operations from these initiators. This static default priority is not dynamically changed to accommodate different priorities for different initiators, or changes in priorities for a given initiator or application with respect to time, and therefore the storage controller is susceptible to being flooded by I/O from a backup system accessing the storage controller as discussed above.

SUMMARY OF THE INVENTION

In accordance with the invention, there is provided a method for dynamically assigning I/O priority by an initiator in an open system, including receiving at a device driver of an initiator device, a datapath command for setting a default I/O priority for a specified logical unit; parsing the datapath command and storing the default I/O priority for the logical unit to a priority store of a storage controller on the logical unit; and exiting the datapath command.

Further in accordance with the invention, there is provided a method for dynamically establishing and controlling I/O priority by a storage controller for a plurality of initiators, including receiving an I/O command from an initiator selectively including an I/O priority default value for a logical unit; responsive to the I/O command being a set default value I/O command, storing the I/O priority default value for the logical unit; and responsive to the I/O command being a data transfer command with respect to the logical unit, queuing the data transfer command for execution based on the I/O priority default value previously stored for the logical unit.

Further in accordance with the invention, there is provided system for controlling I/O transfers, including a host system; a storage controller; the storage controller including a priority store and an operation queue; the host system including an adapter driver; the adapter driver, selectively responsive to a datapath command from an initiator application for setting a default I/O priority for a specified logical unit, for storing the default I/O priority for the logical unit to a priority store of the storage controller, and selectively responsive to a data transfer command from the initiator application for storing the data transfer command to the storage controller; and the storage controller responsive to the datapath command for storing the I/O priority default value for the logical unit to the priority store; and responsive to the data transfer command with respect to the logical unit for queuing the data transfer command for execution based on the I/O priority default value.

Further in accordance with the invention, there is provided a program storage device readable by a machine, tangibly embodying a program of instructions executable by a machine to perform method steps for assigning I/O priority by an initiator in an open system, the method including receiving at a device driver of an initiator device, a datapath command for setting a default I/O priority for a specified logical unit; parsing the datapath command and storing the default I/O priority for the logical unit to a priority store of a storage controller on said logical unit; and exiting said datapath command.

Further in accordance with the invention, there is provided a program storage device readable by a machine, tangibly embodying a program of instructions executable by a machine to perform method steps for dynamically establishing and controlling I/O priority by a storage controller for a plurality of initiators, including comprising receiving an I/O command from an initiator selectively including an I/O priority default value for a logical unit; responsive to said I/O command being a set default value I/O command, storing the I/O priority default value for the logical unit; and responsive to the I/O command being a data transfer command with respect to the logical unit, queuing the data transfer command for execution based on the I/O priority default value previously stored for the logical unit.

Further in accordance with the invention, there is provided a program storage device readable by a machine, tangibly embodying a program of instructions executable by a machine to perform method steps for dynamically establishing and controlling I/O priority by a storage controller for a plurality of initiators, the method steps including receiving from an initiator host selectively an I/O command including an I/O priority default value for accessing a fixed block (FB) disk on a logical unit or a CCW including a prefix or define extent command for accessing an ECKI disk on the logical unit; responsive to the I/O command being a set default value I/O command, storing the I/O priority default value for the logical unit; responsive to the I/O command being a data transfer command with respect to the FB disk on the logical unit, queuing said data transfer command for execution based on the I/O priority default value previously stored for the logical unit; and responsive to the CCW for accessing an ECKD disk on the logical unit, queuing the I/O command for execution based on I/O priority set in the prefix or define extent command.

Other features and advantages of this invention will become apparent from the following detailed description of the an exemplary embodiment of the invention, taken in conjunction with the accompanying drawings.

BEST MODE FOR CARRYING OUT THE INVENTION

In accordance with an embodiment of the invention, a system and method is provided for an open systems server, or initiator, to dynamically assign input/output (I/O) priority using a SCSI command. A relative value that is associated with an I/O request is passed to a storage subsystem that can be used to prioritize the execution of I/O requests from all initiators within a storage subsystem. This function is particularly useful when the storage subsystem is running in a heterogeneous environment or when there is concern that other servers could monopolize storage subsystem resources and cause performance degradation on production servers.

Initiators, or host systems, inform the storage subsystem what the priority should be for each initiator on a per logical unit (LUN) basis. A multipathing driver (FIG. 2, driver 64), or subsystem device driver (SDD) 64 for a storage controller (FIG. 1, controller 31) establishes and controls I/O priority for each host initiator.

U.S. Pat. No. 6,202,095 B1 provides a system for defining characteristics between processing systems, and may be used for communicating operating characteristics from a server to a storage subsystem, thus allowing SDD 64 to establish and modify the priority with which I/O should be processed from each initiator. In an exemplary embodiment of the invention, a SCSI command Define Subsystem Operation (DSO) has its set system characteristics (SSC) order extended to include an I/O priority value to be used for each succeeding I/O for the initiator from which the DSO SSC command was received. An SSD datapath command (the customer CLI interface into SDD 64) sets the I/O priority value for each path under control of SDD per device. Using this method I/O priority can be controlled for each storage subsystem device attached to a server and even for an application on a server.

Figure 1:
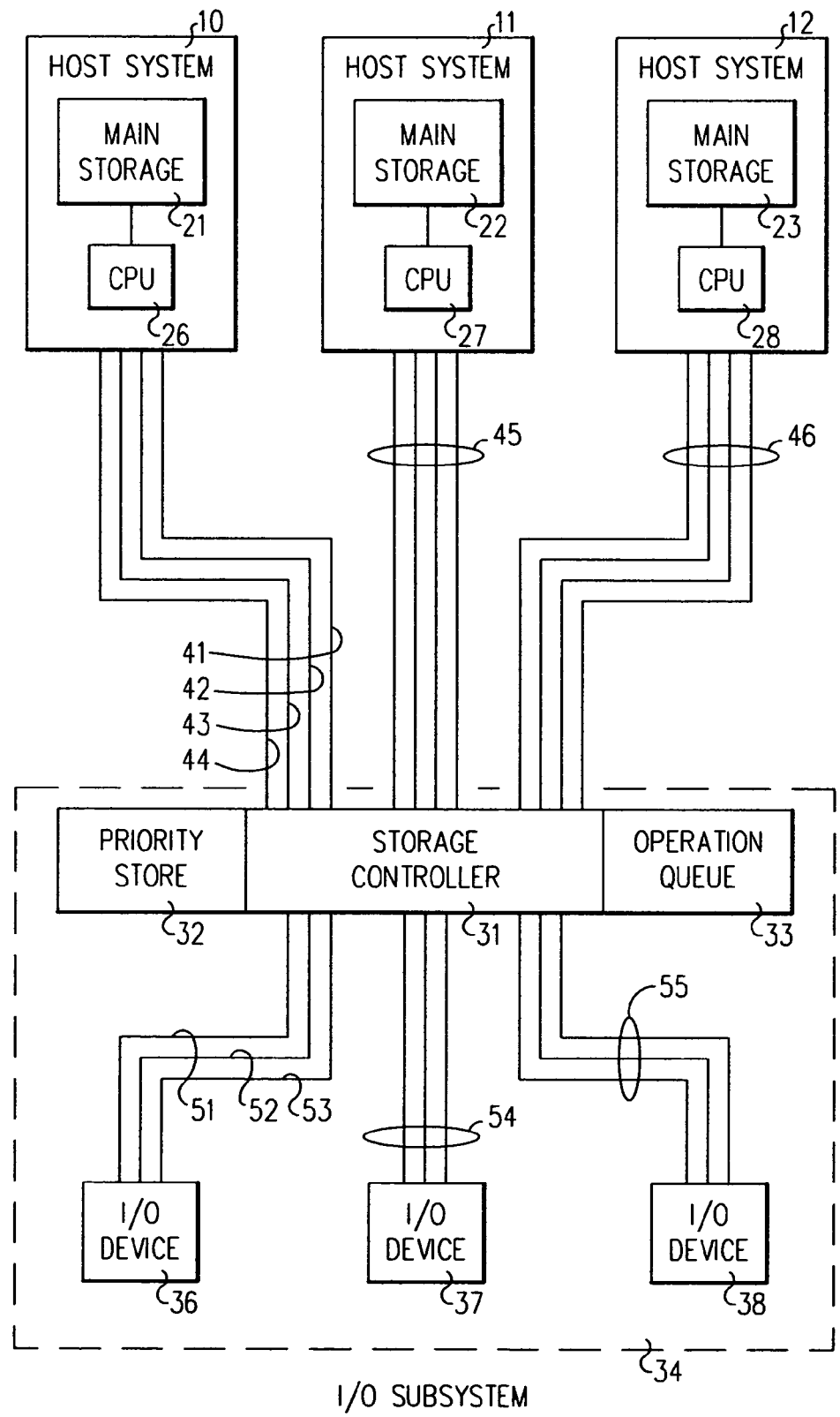
FIG. 1 is a high level system diagram illustrating the system of the invention.

Referring to FIG. 1, the system of the invention includes, by way of example, several host systems 10-12, each a potential initiator of I/O commands with respect to I/O devices 36-38 offstorage controller 31. Each host system includes a respective CPU 26-28 and main storage 21-23. Host system 10 is connected to storage controller 31 by parallel SCSI or fiber channels 41-44, and storage controller 31 is connected to I/O devices 36-38 by communication lines 51-55, respectively, and includes a priority store 32 and operation queue 33.

Priority or operation queue 33 is, in an exemplary embodiment, a simple linked list that can have elements added to the end or inserted at any point in the list based on the priority value. List elements represent I/O to be executed and are taken off the queue as they are executed in priority order.

Priority store 32 is a register or store at controller 31 with an entry for each LUN, or I/O device 36-38 on controller 31.

In a subsystem with internal storage, I/O subsystem 34 includes storage controller 31 and I/O devices 36-38. Each I/O device 36-38 may be referred to as a logical unit (LUN). For a subsystem that manages externally attached storage, an I/O subsystem comprises storage controller 31. Similarly, host system 11 is connected to storage controller 21 by parallel SCSI or fiber channels 45, and host system 12 by parallel SCSI or fiber channels 46. A plurality of such channels 45 represents a path group which may be configured to share a priority. In this system overview, host system 10, for example, may be an open system server, and host system 12, again by way of example, may be an IBM System 390—these disparate host systems forming a heterogeneous system configuration.

For I/O operations with respect to host system 12, for the case of an IBM System 390 application, I/O for high priority transaction operations and I/O for low priority backup operations are interleaved, with each operation including a priority specification by way of a priority value in either the Define Extent or Prefix CCW parameter data.

For I/O operations with respect to host system 10, for the case of an open system host, a default priority is set for each path 41-44, which priority is assigned to each I/O operation on that path, and which priority may be set and changed by way of a SCSI command, described hereafter.

Figure 2:
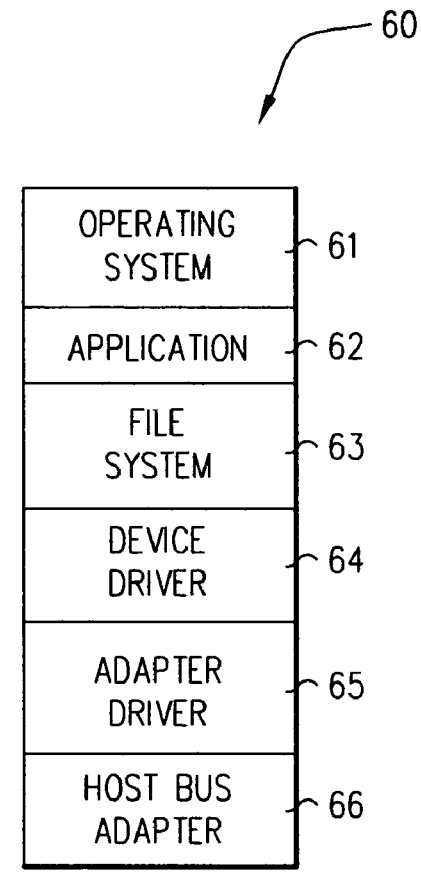
FIG. 2 is a diagrammatic representation of a protocol stack.

Referring to FIG. 2, a protocol stack is illustrated, the various levels of the stack representing code stored in main storage 21-23 for execution by CPU 26-28, respectively. Protocol stack 60 includes an operating system level 61, application level 62, file system level 63, device driver level 64, adapter driver 65, and host bus adapter 66. The processes comprising the method of an exemplary embodiment of the invention are executed in device driver level 64.

Figure 3:
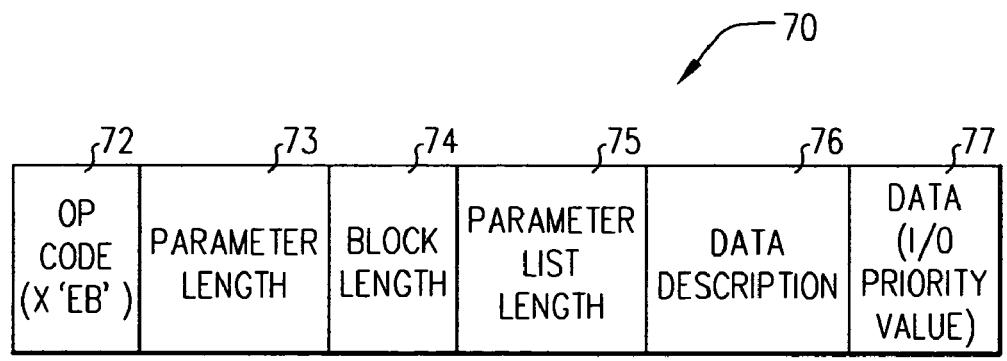
FIG. 3 is a diagrammatic representation of SCSI command.

Referring to FIG. 3, a SCSI command is illustrated. Also referred to as a Command Descriptor Block (CDB), SCSI command 70 includes operation code field 72, parameter length field 73, block length field 74, parameter list length field 75, data description field 76 and data field 77. In accordance with an exemplary embodiment of the invention, for setting and modifying default priority for a path 41, the SCSI command 70 operation code 72 is set to, say, x'EB', data description field 76 to, say, 'establish default priority order code', and then the actual priority code is set in data field 77. This command x'EB' requests that the target storage controller 31 receive control data from the initiator, such as host 10. This data is not recorded on I/O device, such as DASD, 36-38. Rather, controller 31 buffers the data in memory 32 for use by associated functions.

Figure 4:
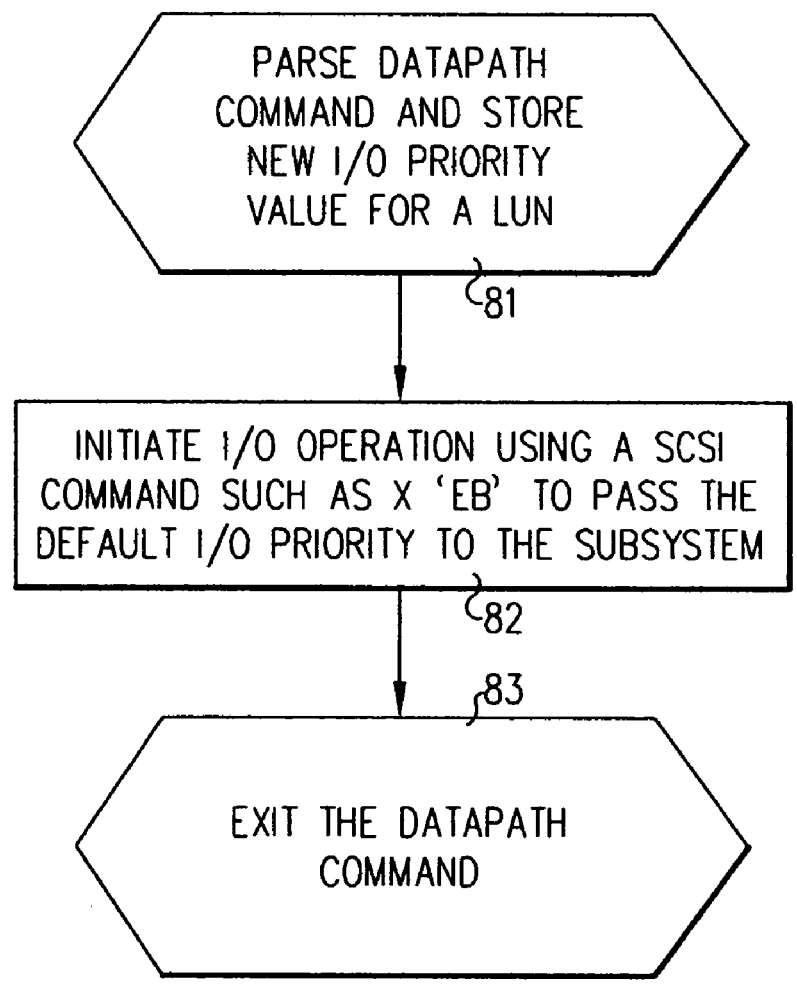
FIG. 4 is a flow diagram illustrating the logic of a datapath command to set a default I/O priority for a logical unit.

Referring to FIG. 4, a flow diagram illustrates the logic of a datapath command to set a default I/O priority for a logical unit 36, 37 or 38. A datapath command is issued by a customer either interactively or as part of a script and is parsed by SDD 64. Included in the command is the identification of the LUN (which is platform dependent, i.e., LUNs are identified differently on most UNIX systems and Windows systems). In step 81, device driver 64 parses a datapath command and stores a new I/O priority value for a logical unit in priority store 32 of storage controller 31, and in step 83 device driver 64 exits the datapath command.

Figure 5:
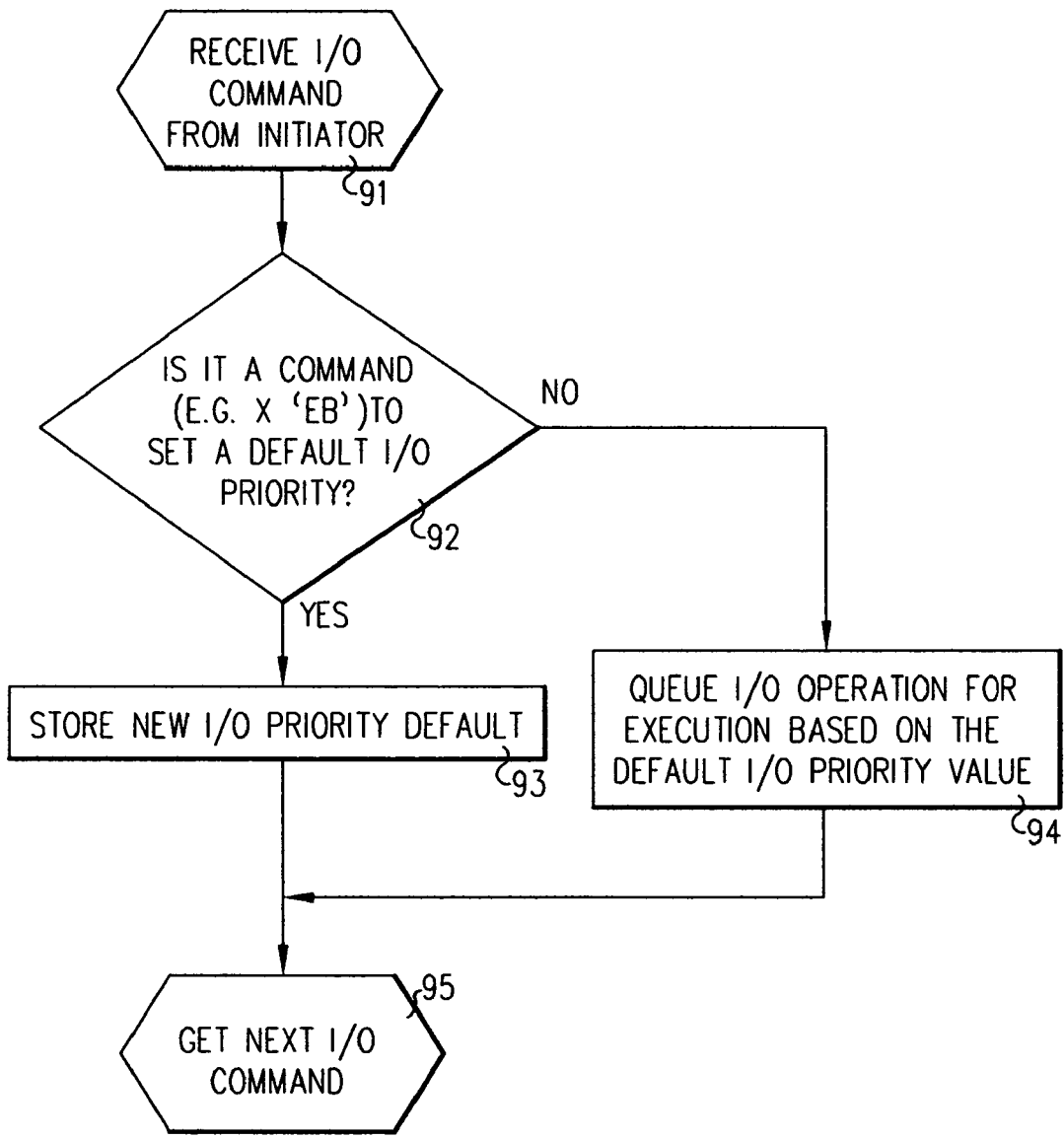
FIG. 5 is a flow diagram illustrating the logic in an I/O subsystem for executing commands based on a default I/O priority.

Referring to FIG. 5, a flow diagram illustrates the logic in an I/O subsystem 34 for executing commands based on a default I/O priority. In step 91, storage controller 31 receives an I/O command 70 from initiator, or host system, 10. In step 92, controller 31 determines if the received command is to set a default I/O priority (that is, is the operation code 72 set to x'EB'). If so, in step 93, storage controller 31 stores the new I/O priority default value for the LUN. The LUN, in this exemplary embodiment, is not identified in the CDB 70. Storage controller 31 knows which LUN the data storage operation (DSO) applies to because the command is addressed to the LUN by initiator 10 in the same way that a data transfer command, such as a read or write command, applies to the LUN 36-38 to which it is sent. If not, the received command may be for an I/O operation, and that operation is queued in operation queue 33 for execution by controller 31 based on the default I/O priority value previously set for this LUN 36-38. In step 95, storage controller 31 gets a next I/O command, and processing returns to step 91.

Device driver 64 of host system 10 generates a SCSI command 70 down each path 41-44 through adapter driver 65 and host bus adapter 66 to storage controller 31.

A System/390 host 12 uses CCWs to access ECKD disks 36-38 and open system hosts 10, 11 use CDBs 70 to access FB disks 36-38. System/390 hosts 12 able to access FB disks will also use SCSI CDBs, and operations are prioritized as previously described with respect to priority store 32 for open system host 10. In the case where a System/390 host 12 using CCWs accesses a FB disk, the I/O priority from a Prefix or Define Extent command (not the I/O priority set in priority store 32 as a result of a DSO command) is what determines where the I/O should be queued in operation queue 33 relative to other requests already queued.

ALTERNATIVE EMBODIMENTS

Figure 6:
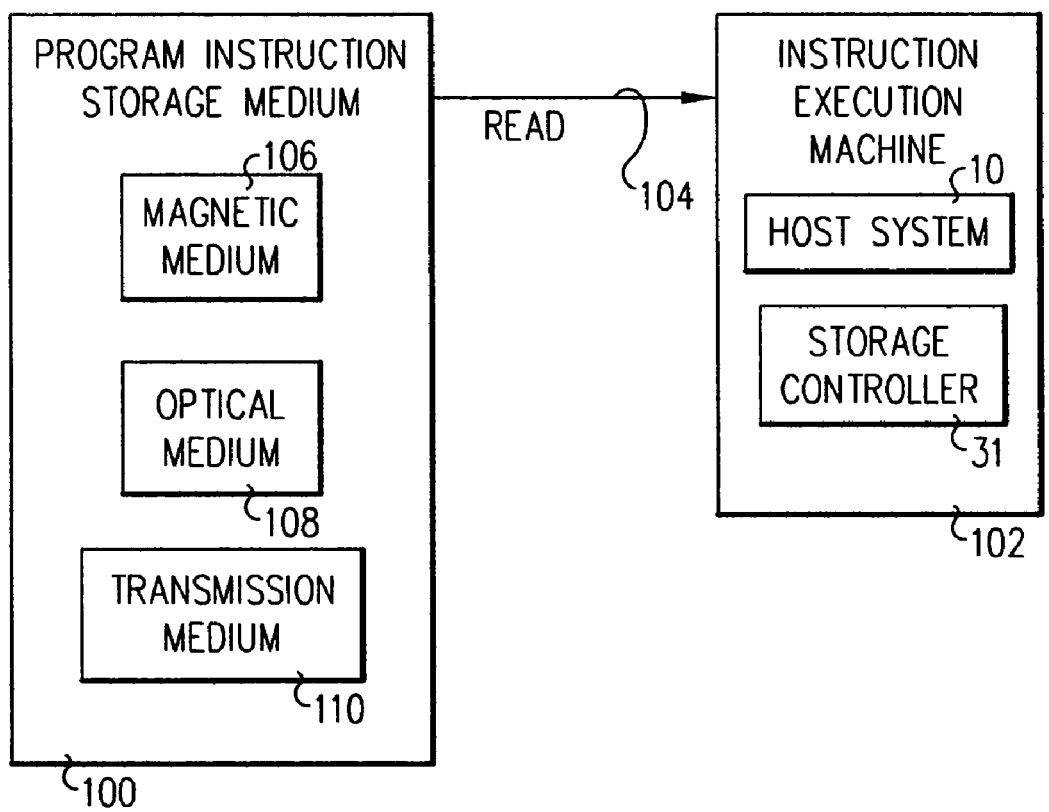
FIG. 6 is a high level system diagram illustrating a program storage device readable by a machine, tangibly embodying a program of instructions executable by a machine to perform method steps for dynamically assigning I/O priority.

It will be appreciated that, although specific embodiments of the invention have been described herein for purposes of illustration, various modifications may be made without departing from the spirit and scope of the invention. Referring to FIG. 6, in particular, it is within the scope of the invention to provide a computer program product or program element, or a program storage or memory device 100 such as a solid or fluid transmission medium 110, magnetic or optical wire, tape or disc 106, 108, or the like, for storing signals readable by a machine as is illustrated by line 104, for controlling the operation of a computer 102, such as a host system 10 or storage controller 31, according to the method of the invention and/or to structure its components in accordance with the system of the invention.

Further, each step of the method may be executed on any general purpose computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for dynamically assigning I/O priority by a given open system initiator of a plurality of disparate initiators including at least one open system initiator and at least one other initiator, an open system initiator being a host system which uses command descriptor blocks to access fixed block devices on logical units, comprising:

receiving at a device driver at said given open system initiator, a datapath command for setting a default I/O priority value for a specified logical unit, said default I/O priority value being specific to a specific one of a plurality of applications on said given open system initiator;

parsing said datapath command to determine said default I/O priority value;

storing said default I/O priority value for said logical unit to a priority store of a storage controller on said logical unit;

exiting said datapath command; and operating said storage controller to access said priority store and process I/O requests from said given open system initiator in accordance with said default I/O priority value.

2. The method of claim 1, said datapath command including logical unit identifying indicia and being selectively issued to said device driver by a customer interactively or as script.

3. method of claim 1, said storing including sending to said storage controller a set I/O priority default value I/O command.

4. A method for dynamically establishing and controlling I/O priority by a storage controller for a plurality of initiators in a system of disparate initiators including at least one open system initiator and at least one other initiator, comprising:
  receiving at said storage controller an I/O command from a first open system initiator of said plurality of initiators selectively including an I/O priority default value for a logical unit set by said open system first initiator, an open system initiator being a host system which uses command descriptor blocks to access fixed block devices on logical units, said I/O priority default value being specific to a specific one of a plurality of applications on said first open system initiator;
  responsive to said I/O command being a set default value I/O command, storing said I/O priority default value at said storage controller for thereafter processing data transfer commands from said first open system initiator for said logical unit; and
  responsive to said I/O command being a data transfer command with respect to said given logical unit, queuing said data transfer command from said first open system initiator for execution based on said I/O priority default value previously stored for said logical unit.

5. The method of claim 4, further comprising:
  queuing said data transfer commands by inserting them in a linked list in accordance with said I/O priority default value;
  executing said data transfer commands in priority order as defined by said linked list.

6. A method for effecting data transfer in a system including a plurality of disparate host initiators, including at least one open system initiator, and at least one storage controller, comprising:
  receiving at a device driver of a given initiator device, a datapath command for setting a default I/O priority for a specified logical unit, said default I/O priority value being specific to a first application at a first host initiator;
  parsing said datapath command to determine said default I/O priority;
  transmitting said default I/O priority to said storage controller as a datapath I/O command;
  responsive to said datapath I/O command, storing said default I/O priority for said logical unit to a priority store of said storage controller on said logical unit;
  exiting said I/O datapath command;
  thereafter issuing as a command distinct from said I/O datapath command to said storage controller from said first host initiator a data transfer I/O command;
  receiving at said storage controller an I/O command from said first host initiator;
  responsive to said I/O command being a set default value I/O command, storing said I/O priority default value for processing data transfer commands from said first host initiator directed to said logical unit; and
  responsive to said I/O command being a data transfer command from said first host initiator with respect to said logical unit, queuing said data transfer command for execution based on said I/O
  priority default value previously stored at said storage controller for data transfer commands from said first host initiator to said logical unit.

* * * * *